US011992463B2

(12) United States Patent
Yan et al.

(10) Patent No.: US 11,992,463 B2
(45) Date of Patent: May 28, 2024

(54) CONNECTOR FOR CONNECTING A MEDICAL INJECTION DEVICE TO A CONTAINER

(71) Applicant: Becton Dickinson France, Le Pont de Claix (FR)

(72) Inventors: Bo Yan, Shanghai (CN); Jean-Bernard Hamel, Saint Cassien (FR); Longxiang Huang, Suzhou (CN)

(73) Assignee: Becton Dickinson France, Le Pont de Claix (FR)

( * ) Notice: Subject to any disclaimer, the term of this patent is extended or adjusted under 35 U.S.C. 154(b) by 841 days.

(21) Appl. No.: 17/055,674

(22) PCT Filed: Apr. 30, 2019

(86) PCT No.: PCT/EP2019/061102
§ 371 (c)(1),
(2) Date: Nov. 16, 2020

(87) PCT Pub. No.: WO2019/219383
PCT Pub. Date: Nov. 21, 2019

(65) Prior Publication Data

US 2021/0186814 A1 Jun. 24, 2021

(30) Foreign Application Priority Data

May 17, 2018 (EP) .................................... 18305609

(51) Int. Cl.
*A61J 1/20* (2006.01)
*A61J 1/14* (2023.01)

(52) U.S. Cl.
CPC .......... *A61J 1/2096* (2013.01); *A61J 1/1412* (2013.01); *A61J 1/201* (2015.05); *A61J 1/2027* (2015.05); *A61J 1/2048* (2015.05)

(58) Field of Classification Search
CPC .......... A61J 1/2048–2065; A61J 1/1406; A61J 1/1412–1425; A61J 1/20; A61J 1/201;
(Continued)

(56) References Cited

U.S. PATENT DOCUMENTS 5,641,010 A * 6/1997 Maier .................. A61J 1/2096 604/416
5,893,397 A 4/1999 Peterson et al.
(Continued)

FOREIGN PATENT DOCUMENTS

EP 0783879 A2 7/1997
JP H09290012 A 11/1997
(Continued)

*Primary Examiner* — Rebecca E Eisenberg
*Assistant Examiner* — Linnae E. Raymond
(74) *Attorney, Agent, or Firm* — The Webb Law Firm

(57) ABSTRACT

The present disclosure relates to a connector for connecting a medical injection device to a container closed by a septum. The connector has a distal tip and a sleeve extending around the tip. The sleeve has an inner threaded portion. The connector includes a proximal part configured to engage the tip of the injection device. The proximal part includes an outer threaded portion configured to be removably screwed to the inner threaded portion of the sleeve, distal part configured to be connected to the container, and a hollow spike extending from the proximal part. The hollow spike has an internal volume in fluidic connection with the injection device and perforates the septum of the container when the distal part is connected to the container. The spike includes an opening in a distal end being configured to create a connection between the medical injection device and the container.

20 Claims, 9 Drawing Sheets

(58) Field of Classification Search
CPC ...... A61J 1/2003; A61J 1/2027; A61J 1/2096; A61M 5/50
See application file for complete search history.

(56) References Cited

U.S. PATENT DOCUMENTS

| | | | | |
|---|---|---|---|---|
| 8,985,162 | B2 | 3/2015 | Aneas | |
| 9,943,463 | B2 | 4/2018 | Marks et al. | |
| 9,962,497 | B2 * | 5/2018 | Takemoto | A61M 5/326 |
| 2011/0160701 | A1 * | 6/2011 | Wyatt | A61J 1/2096 604/406 |
| 2012/0330267 | A1 * | 12/2012 | Domkowski | A61J 1/2089 604/414 |
| 2013/0289515 | A1 * | 10/2013 | Barron, III | A61J 1/2089 604/411 |
| 2014/0096862 | A1 * | 4/2014 | Aneas | B65B 3/003 141/1 |
| 2022/0370290 | A1 * | 11/2022 | Brandenburger | A61J 1/10 |

FOREIGN PATENT DOCUMENTS

| | | | | |
|---|---|---|---|---|
| JP | 2016515406 | A | 5/2016 | |
| JP | 2016521177 | A | 7/2016 | |
| WO | 2007017868 | A1 | 2/2007 | |
| WO | WO-2007017868 | A1 * | 2/2007 | A61J 1/2089 |
| WO | 2012168235 | A1 | 12/2012 | |
| WO | 2014144096 | A1 | 9/2014 | |
| WO | 2015022787 | A1 | 2/2015 | |
| WO | 2015134777 | A1 | 9/2015 | |

* cited by examiner

CONNECTOR FOR CONNECTING A MEDICAL INJECTION DEVICE TO A CONTAINER

CROSS-REFERENCE TO RELATED APPLICATIONS

This application is the United States national phase of International Application No. PCT/EP2019/061102 filed Apr. 30, 2019, and claims priority to European Patent Application No. 18305609.2 filed May 17, 2018, the disclosures of which are hereby incorporated by reference in their entirety.

BACKGROUND OF THE INVENTION

Technical Field of the Invention

The invention relates to a connector for connecting a medical injection device to a container. The invention also relates to a method for filling a medical injection device with a composition contained in a container by connecting said injection device to the container with the connector.

Technical Background

In the field of medicament packaging, it is known to store a drug content, in the form for example of a lyophilized drug, a power drug or an active substance of a drug, in a medical container usually referred to as a "vial". A vial is typically made of glass and is sealed by an elastomer septum that is crimped by an aluminum cap. A portion of elastomer at the center of the septum is covered by plastic part or aluminum part which can be removed by the healthcare professional prior reconstitution procedure so that the healthcare professional can access to a center portion in rubber that can be pierced by a needle of an injection device such as a syringe.

To reconstitute the drug, the user uses usually a disposable plastic syringe to transfer the diluent from an ampoule or a vial into the vial containing the lyophilized drug or power drug. When the diluent is already stored in a prefilled syringe, typically made of glass, the healthcare professional transfers the diluent directly from the syringe to the vial containing the lyophilized drug or power drug. The healthcare professional uses for this transfer a needle to pierce the rubber septum of the vial.

However this process comprises a significant number of steps.

Moreover, during the whole process, the needle tip may be damaged due to the removal of the needle shield, piercing of the septum of the vial, and/or misalignment during insertion of the needle. A damaged or bent needle may lead to injuries of the patient during the injection of the drug.

Another major drawback of the known processes is that, during the reconstitution process, the needle of the syringe is left free and unprotected. This represents a high risk of accident for the user as well as for the patient or any person around who were to come into contact with the needle, and may lead to needle stick injuries.

Furthermore, when the user withdraws the reconstituted drug from the vial through the needle, the user needs to adjust the length of the portion of the needle that is inserted in the vial as the amount of drug in the vial decreases. In a practical way, the user needs to slowly draw the needle back from the container by pulling the syringe away from the vial, so that the opening of the needle constantly remains in contact with the drug, in other terms, below the surface of the drug.

Not only this handling is hard to perform, but also such movement of the needle in the vial may lead to a loss of a significant amount of drug that remains in the vial.

Document WO2012/168235 describes a connection device that comprises a subassembly including a plug intended to be connected to a medical container, a needle extending from the plug, a sealing sleeve arranged around the needle, and a base with a penetrating member. The base defines an inner volume that is configured to accommodate the subassembly. The penetrating member is configured to pierce the septum of a vial, defines an inner volume adapted to accommodate the needle, and comprises an opening for transferring a composition from the medical container connected to the needle to the vial, for reconstituting a drug contained in the vial.

However, this connection device cannot be connected to a prefilled syringe filled with diluent for a long-term storage, only designed as a disposable device for extemporaneous storage. Indeed, the needle is not sealed when the connection device is connected to the syringe. Thus, the sterility of the content of the syringe cannot be ensured.

Moreover, the penetrating member is exposed, which represents a risk of injury to the user or any person around the device.

SUMMARY OF THE INVENTION

The invention aims to provide a connector that overcomes the drawbacks detailed previously. In that matter, the invention aims to provide a connector for connecting a prefilled medical injection device, such as a syringe or the like, to a container, such as a vial or the like, that is more intuitive to use and to set up, comprises a reduced number of constitutive parts and reduces the overall number of steps to transfer the reconstitute the drug.

To this end, one object of the invention is a connector for connecting a medical injection device having a distal tip and a sleeve extending around the tip, the sleeve being provided with an inner threaded portion, to a container closed by a pierceable septum, said connector comprising:

- a proximal part configured to sealingly engage the tip of the injection device, the proximal part comprising an outer threaded portion configured to be removably screwed to the inner threaded portion of the sleeve,
- a distal part configured to be connected to the container,
- a hollow spike extending distally from the proximal part, having an internal volume configured to be in fluidic connection with the injection device, the spike being configured to perforate the pierceable septum of the container when the distal part is connected to the container, the spike comprising an opening in a distal end, said opening being configured to create a fluidic connection between the medical injection device and the container.

The threaded portions of the sleeve and the proximal portion ensure a tight, reliable, and sealed connection between the injection device and the connector that prevents any leak of a composition flowing between the injection device and the connector, which is especially important for long term storage pre-filled syringes. Moreover, screwing and unscrewing the connector to the injection device is easy, fast, and does not require physical strength, contrary to, for example, a snap-in connection.

According to other optional features of the device of the invention:

The distal part comprises a skirt extending around the hollow spike, the skirt being adapted to enclose at least the collar of the container when connected to said container. The skirt thus ensures a tight and reliable connection between the connector and the container.

The skirt comprises at least one rim that extends radially inwardly, said rim being configured to engage a recess of the collar of the container when the skirt is connected to the container. The rim prevents the connector from being pulled away in a proximal direction from the container, especially during storage.

The skirt is adapted to deflect radially outwardly when connected to the container. This allows the skirt to adapt to the dimensions of the collar of the container. Connecting the connector to the container is thus easier.

The skirt is provided with a plurality of flexible tabs separated from each other by recesses, the flexible tabs being configured to deflect radially outwardly when the skirt is connected to the container. The flexible tabs render the skirt more flexible and the skirt further fits to the collar of the container.

The skirt may extend more distally than the spike. The skirt thereby acts as a guide that facilitates the centering of the spike when piercing the septum of the container.

Alternatively, the spike may extend more distally than the skirt.

According to an embodiment, the internal volume of the hollow spike is configured to accommodate a needle of the injection device fixed to the tip of said injection device. In this way, the hollow spike covers the needle. When connecting the connector to the container, the spike pierces the septum of the container, letting the needle enclosed therein untouched. This prevents any deformation or damage to the needle.

The connector comprises a sealing cap mounted on the hollow spike so as to sealingly enclose at least the opening of the hollow spike. The sealing cap is put on the spike before use of the connector, typically during storage. In more details, the connector is connected to the injection device previously filled with a composition, and the sealing cap is put on the spike so as to cover it. The sealing cap sealingly isolates the spike, and in particular the opening of the spike, from the outside, which reduces the risk of contamination of the composition. Moreover, the sealing cap covers the pointed end of the spike, thereby preventing the user from pricking himself or any person around with the spike and the needle enclosed herein. When the connector is connected to a pre-filled syringe, the sealing cap also enables to close the spike and then the pre-filled syringe.

The skirt comprises a flange, the sealing cap comprises a closed distal part, a proximal part provided with an opening, and a hollow body that extends from the opening towards the distal part, the hollow body being configured to sealingly engage the hollow spike, and the proximal part of the sealing cap being configured to be sealingly and at least partially inserted into a groove provided in the flange so that said proximal part of the sealing cap radially abuts an inner surface of the groove. The sealing of the hollow spike is thus optimal.

The sealing cap further comprises a ring protruding radially outwardly from the hollow body, said ring being configured to abut the skirt when the sealing cap is mounted on the hollow spike so as to retain the sealing cap on the hollow spike. The combination of the ring and the skirt prevents the sealing cap from being pulled off during sterilization, handling, and/or transportation of the connector.

The ring is configured to abut the rim of the skirt when the sealing cap is mounted on the hollow spike. In that way, the skirt not only is used for connecting the connector to the container, but also said skirt prevents the sealing cap from being pulled off.

The ring is preferably integral with the sealing cap. This facilitates the manufacturing of the sealing cap. For example, the sealing cap provided with the ring is made by molding.

The distal part of the sealing cap comprises a grip portion configured to protrude distally away from the skirt when the sealing cap is mounted on the hollow spike, and configured to be handled by a user for mounting or removing the sealing cap from the hollow spike.

The grip portion comprises a stem that protrudes from the skirt, and a flange substantially perpendicular to the stem that acts as a handle configured to be gripped between a user's fingers to manipulate the sealing cap.

The connector is preferably in a single piece, apart from the sealing cap when present. In other terms, the proximal part, the distal part, and the spike of the connector are made in a single piece of material, which makes the connector readily usable with no pre-assembling requirement. The sealing cap consists of another piece configured to be mounted on the spike.

Another object of the invention is an assembly comprising:

a medical injection device comprising a distal tip and a sleeve extending around the tip, and a connector as described previously, wherein the proximal part of the connector is in threaded engagement with the threaded portion of the sleeve and sealingly engages the tip of the medical injection device.

This assembly has the significant advantage to allow long term storage.

According to other optional features of the assembly of the invention:

The medical injection device comprises a needle staked in the tip, said needle extending into the hollow spike of the connector.

The needle extends into the hollow spike up to the opening of the spike. An injection outlet of the needle and the opening of the spike face each other in an oblique or substantially radial direction. Hence, the composition passes directly from the outlet of the needle to the opening of the spike, or in other way from the opening of the spike to the outlet of the needle. This limits the contact of the composition with the inner volume of the spike and limits pressure losses.

Alternatively, the medical injection device may not comprise any staked needle, such that the needle may be assembled on the medical injection device after the reconstitution.

The medical injection device is preferably a pre-filled syringe.

The pre-filled syringe is preferably filled with a diluent intended to be mixed with a lyophilized drug or a power drug contained in the container to reconstitute a drug.

According to different embodiments, the medical injection device may comprise a barrel in plastic or in glass.

According to different embodiments, the barrel, the tip and the sleeve may be integrally formed as a single piece, or the barrel may be in glass while the tip and sleeve are in plastic.

The medical injection device is a prefilled syringe, and the connector is a connector that comprises a sealing cap as described above, the sealing cap being mounted onto the hollow spike.

Another object of the invention is a method for transferring a composition from a container sealed by a pierceable septum, to a medical injection device, the method comprising the following steps:

providing a prefilled medical injection device with a tip and a sleeve extending around the tip, the sleeve being provided with a threaded portion, and a connector as described previously screwed to the tip via the threaded portion of the sleeve, connecting the connector to the container by engaging the distal part of the connector with the container, the hollow spike thereby perforating the septum of the container, transferring into the container a first composition contained in the injection device through the internal volume of the spike, mixing the first composition with a second composition contained in the container, drawing the mixed compositions from the container back to the injection device, unscrewing the injection device from the connector.

Reducing the number of steps during reconstitution enables to decrease potential contamination risk and needle stick injuries risk.

According to other optional features of the method of the invention:

The connector comprises a sealing cap as described above mounted onto the hollow spike.

Prior to connecting the connector to the container, the sealing cap is removed from the spike so as to expose the spike and the opening.

The first composition is a diluent and the second composition is a drug content, the transferring and mixing steps being carried out to reconstitute a drug.

The needle of the medical injection device is staked in the tip of said medical injection device.

The method further comprises removably mounting a needle on the tip of the injection device after unscrewing the injection device from the connector.

The container is preferably a vial.

The vial may be filled with a lyophilized drug or a power drug.

The invention also relates to a connector for connecting a medical injection device having a distal tip and a sleeve extending around the tip, to a container closed by a pierceable septum, said connector comprising:

a proximal part configured to sealingly engage the tip of the injection device, and to be connected to the sleeve, a distal part configured to be connected to the container, a hollow spike extending distally from the proximal part, having an internal volume configured to be in fluidic connection with the injection device, the spike being configured to perforate the pierceable septum of the container when the distal part is connected to the container, the spike comprising an opening in a distal end, said opening being configured to create a fluidic connection between the medical injection device and the container, a sealing cap mounted on the hollow spike so as to sealingly enclose at least the opening of the hollow spike.

The injection device and the connector are sealingly connected to each other, which prevents any leak of a composition flowing between the injection device and the connector. This is especially important for long term storage pre-filled syringes.

The sealing cap is put on the spike before use of the connector, typically during storage. In more details, the connector is connected to the injection device previously filled with a composition, and the sealing cap is put on the spike so as to cover it. The sealing cap sealingly isolates the spike, and in particular the opening of the spike, from the outside, which reduces the risk of contamination of the composition. Moreover, the sealing cap covers the pointed end of the spike, thereby preventing the user from pricking himself or any person around with the spike and the needle enclosed herein. When the connector is connected to a pre-filled syringe, the sealing cap also enables to close the spike and then the pre-filled syringe.

According to other optional features of the device of the invention:

The sleeve of the medical injection device is provided with an inner threaded portion, the proximal part comprises an outer threaded portion configured to be removably screwed to the inner threaded portion of the sleeve. The threaded portions of the sleeve and the proximal portion ensure a tight, reliable, and sealed connection between the injection device and the connector that further prevents any leak of a composition flowing between the injection device and the connector. Moreover, screwing and unscrewing the connector to the injection device is easy, fast, and does not require physical strength, contrary to, for example, a snap-in connection.

The distal part comprises a skirt extending around the hollow spike, the skirt being adapted to enclose at least the collar of the container when connected to said container. The skirt thus ensures a tight and reliable connection between the connector and the container.

The skirt comprises at least one rim that extends radially inwardly, said rim being configured to engage a recess of the collar of the container when the skirt is connected to the container. The rim prevents the connector from being pulled away in a proximal direction from the container, especially during storage.

The skirt is adapted to deflect radially outwardly when connected to the container. This allows the skirt to adapt to the dimensions of the collar of the container. Connecting the connector to the container is thus easier.

The skirt is provided with a plurality of flexible tabs separated to each other by recesses, the flexible tabs being configured to deflect radially outwardly when the skirt is connected to the container. The flexible tabs render the skirt more flexible and the skirt further fits to the collar of the container.

The skirt may extend more distally that the spike. The skirt thereby acts as a guide that facilitates the centering of the spike when piercing the septum of the container.

Alternatively, the spike may extend more distally than the skirt.

According to an embodiment, the internal volume of the hollow spike is configured to accommodate a needle of the injection device fixed to the tip of said the injection device. In this way, the hollow spike covers the needle. When connecting the connector to the container, the spike pierces the septum of the container, letting the needle enclosed therein untouched. This prevents any deformation or damage to the needle.

The skirt comprises a flange, the sealing cap comprises a closed distal part, a proximal part provided with an opening, and a hollow body that extends from the opening towards the distal part, the hollow body being configured to sealingly engage the hollow spike, and the proximal part of the sealing cap being configured to be sealingly and at least partially inserted into a groove provided in the flange so that said proximal part of the sealing cap radially abuts an inner surface of the groove. The sealing of the hollow spike is thus optimal.

The sealing cap further comprises a ring protruding radially outwardly from the hollow body, said ring being configured to abut the skirt when the sealing cap is mounted on the hollow spike so as to retain the sealing cap on the hollow spike. The combination of the ring and the skirt prevents the sealing cap from being pulled off during sterilization, handling, and/or transportation of the connector.

The ring is configured to abut the rim of the skirt when the sealing cap is mounted on the hollow spike. In that way, the skirt not only is used for connecting the connector to the container, but also said skirt prevents the sealing cap from being pulled off.

The ring is preferably integral with the sealing cap. This facilitates the manufacturing of the sealing cap. For example, the sealing cap provided with the ring is made by molding.

The distal part of the sealing cap comprises a grip portion configured to protrude distally away from the skirt when the sealing cap is mounted on the hollow spike, and configured to be handled by a user for mounting or removing the sealing cap from the hollow spike.

The grip portion comprises a stem that protrudes from the skirt, and a flange substantially perpendicular to the stem that acts as a handle configured to be gripped between a user's fingers to manipulate the sealing cap.

The connector is preferably in a single piece, which does not include the sealing cap when present. In other terms, the proximal part, the distal part, and the spike of the connector are made in a single piece of material, which makes the connector readily usable with no pre-assembling requirement. The sealing cap consists of another piece configured to be mounted on the spike.

Another object of the invention is an assembly comprising:

a medical injection device comprising a barrel, a tip extending distally from the barrel, and a sleeve extending around the tip and a connector as described previously, wherein the proximal part of the connector sealingly engages the tip of the medical injection device.

This assembly has the significant advantage to allow long term storage.

According to other optional features of the assembly of the invention:

The medical injection device comprises a needle staked in the tip, said needle extending into the hollow spike of the connector.

The needle extends into the hollow spike up to the opening of the spike. An injection outlet of the needle and the opening of the spike face each other in an oblique or substantially radial direction. Hence, the composition passes directly from the outlet of the needle to the opening of the spike, or in other way from the opening of the spike to the outlet of the needle. This limits the contact of the composition with the inner volume of the spike and limits pressure losses.

Alternatively, the medical injection device may not comprise any staked needle, such that the needle may be assembled on the medical injection device after the reconstitution.

The medical injection device is preferably a pre-filled syringe.

The pre-filled syringe is preferably filled with a diluent intended to be mixed with a lyophilized drug or a power drug contained in the container to reconstitute a drug.

According to different embodiments, the medical injection device may comprise a barrel in plastic or in glass.

According to different embodiments, the barrel, the tip and the sleeve may be integrally formed as a single piece, or the barrel may be in glass while the tip and sleeve are in plastic.

The medical injection device is a prefilled syringe.

Another object of the invention is a method for transferring a composition from a container sealed by a pierceable septum, to a medical injection device, the method comprising the following steps:

providing a prefilled medical injection device with a tip and a sleeve extending around the tip, and a connector as described previously connected to the sleeve, connecting the connector to the container by engaging the distal part of the connector with the container, the hollow spike thereby perforating the septum of the container, transferring into the container a first composition contained in the injection device through the internal volume of the spike, mixing the first composition with a second composition contained in the container, drawing the mixed compositions from the container back to the injection device, separating the injection device from the connector.

Reducing the number of steps during reconstitution enables to decrease potential contamination risk and needle stick injuries risk.

According to other optional features of the method of the invention:

Prior to connecting the connector to the container, the sealing cap is removed from the spike so as to expose the spike and the opening.

The first composition is a diluent and the second composition is a drug content, the transferring and mixing steps being carried out to reconstitute a drug.

The needle of the medical injection device is staked in the tip of said medical injection device.

The method further comprises removably mounting a needle on the tip of the injection device after separating the injection device from the connector.

The container is preferably a vial.

The vial may be filled with a lyophilized drug or a power drug.

BRIEF DESCRIPTION OF THE DRAWINGS

Further features and advantages of the invention will become apparent from the detailed description to follow, with reference to the appended drawings, in which.

DETAILED DESCRIPTION OF THE INVENTION

Figure 1:
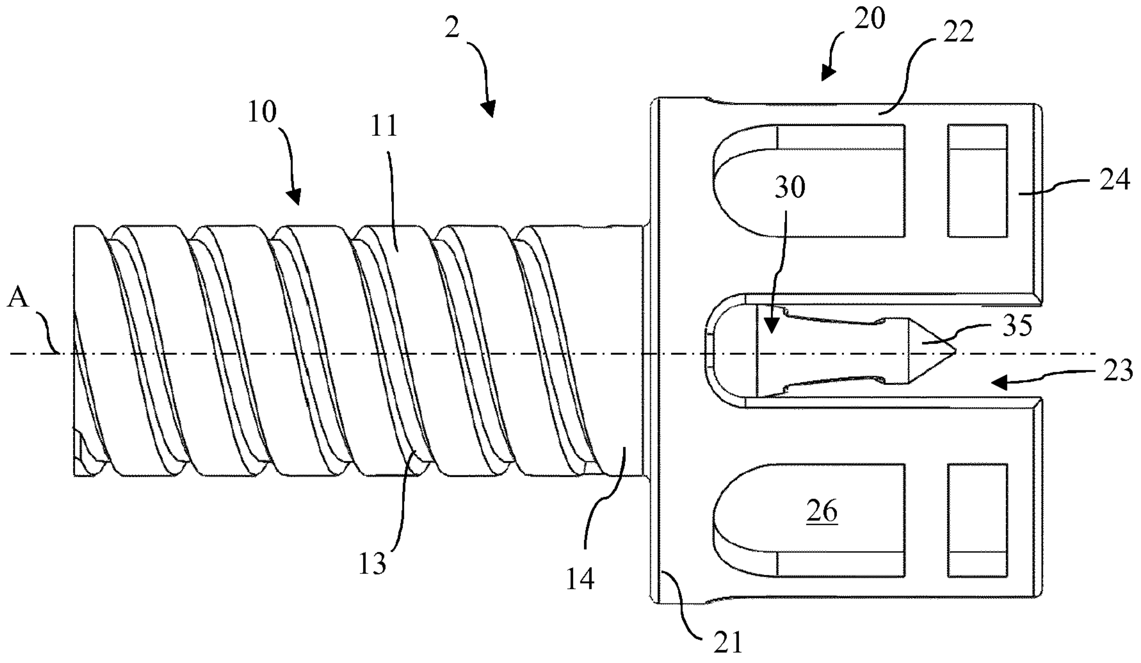
FIG. 1 is a side view of an embodiment of a connector of the invention.

A first object of the invention is a connector for connecting a medical injection device to a container closed by a pierceable septum. An embodiment of the connector is represented in FIG. 1.

Figure 2:
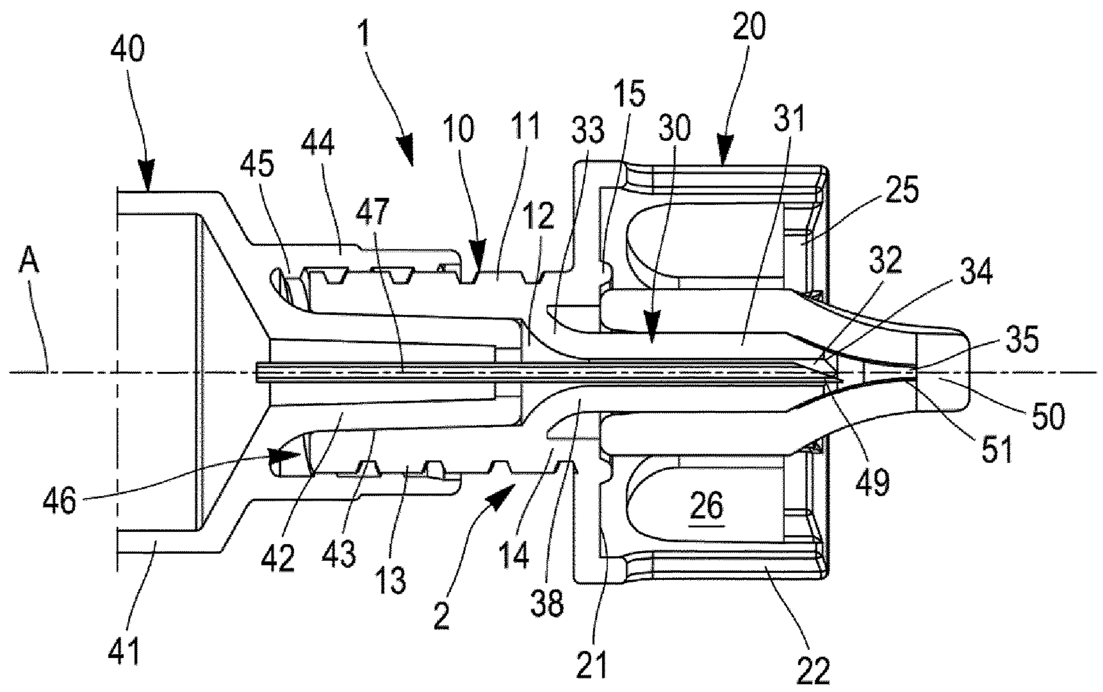
FIG. 2 is a side sectional view of a first embodiment of an assembly obtained by connecting the connector to a medical injection device, wherein the medical injection device is provided with a tip having a needle attached thereto, and a sleeve extending around the tip.
Figure 3:
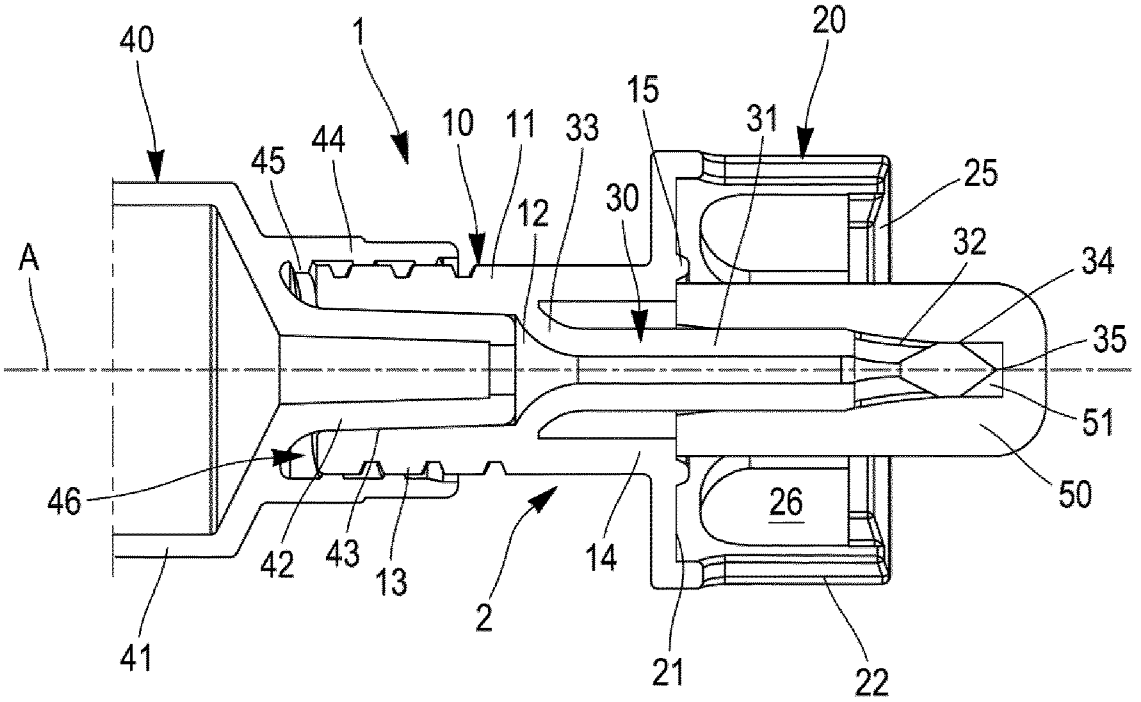
FIG. 3 is a side sectional view of a second embodiment of an assembly obtained by connecting the connector to a medical injection device, wherein the medical injection device is provided with a tip with no needle and a sleeve extending around the tip.

The connector and the injection device connected to each other form an assembly, a first and a second embodiment of which are represented in FIGS. 2 and 3.

According to the first embodiment represented in FIG. 2, the connector 2 is connected to an injection device 40 provided with a needle 47. The injection device is preferably a pre-filled syringe.

According to the second embodiment represented in FIG. 3, the connector 2 is connected to an injection device 40 with no needle. The injection device is preferably a pre-filled syringe. A separate needle 70 is removably connected to the injection device 40 only after separating said injection device from the connector, as explained further.

Both the first and second embodiments will be described in parallel in the following.

In reference to FIGS. 1, 2 and 3, the connector 2 extends along a longitudinal axis A. The connector 2 comprises a proximal part 10 configured to be connected to the tip 42 of the injection device 40, a distal part 20 configured to be connected to a container 60, and a hollow spike 30 configured to pierce the septum 63 of the container when the distal part 20 is connected to the container. The container 60 is preferably a vial.

The tip 42 of the injection device extends distally from the barrel 41 and is advantageously of a cylindrical or frustoconical shape.

A sleeve 44 extends around and at a distance from the tip in the radial direction, thereby defining a housing 46 between the tip and the sleeve.

The sleeve 44 comprises an inner surface provided with a threaded portion 45 that faces the outer surface 43 of the tip.

Such a combination of the tip and the sleeve may be known as a LUER-LOK™ connection, although the invention is not limited to a connection sold under this designation.

According to one embodiment, the barrel, tip and sleeve are made as a single part, by plastic injection molding. According to another embodiment, the barrel is made in glass, whereas the tip and sleeve are made in plastic.

The proximal part 10 of the connector comprises a body 11 that encloses a hollow inner volume 12. The outer surface of the body is provided with a threaded portion 13 which is configured to be screwed to the corresponding threaded portion 45 of the inner surface of the sleeve 44. The inner surface of the body has a shape complementary to the outer surface of the tip to ensure a tight connection with the tip.

The connector 2 is connected to the injection device 40 by inserting the body 11 of the connector in the housing 46 between the tip and the sleeve, by screwing the threaded portions 13, 45 of the body 11 and the sleeve 44. At the same time, the tip 42 of the injection device is inserted in the inner volume 12 of the proximal part up to a distal region 14 of the proximal part.

Figure 4:
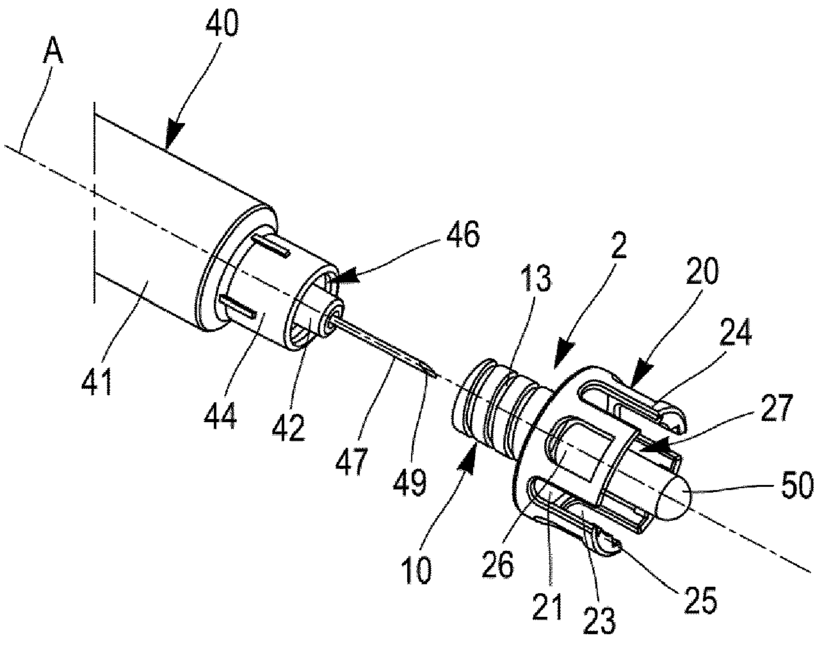
FIG. 4 is a perspective view of the connector of FIG. 1, wherein the connector and the injection device are put close to each other prior to being connected.
Figure 5:
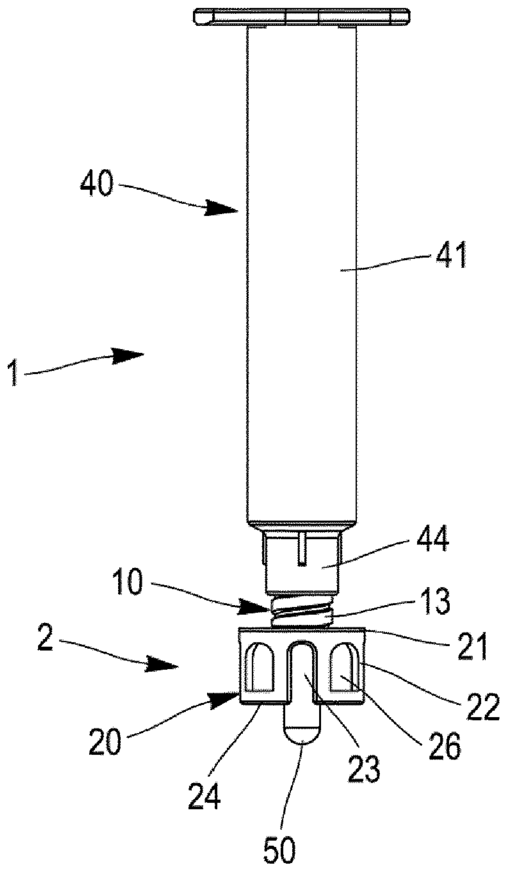
FIG. 5 is a side view of the connector of FIG. 1, wherein the connector and the injection device are connected to each other to form the assembly of FIG. 2.

FIG. 4 shows the alignment of the connector 2 and the injection device 40 along the axis A before connection, and a general side view of the resulting assembly 1 is represented in FIG. 5.

The screwing of the proximal part 10 of the connector to the sleeve 44 of the injection device ensures a tight and sealed connection between the connector 2 and the injection device 40, preventing any movement of the connector and the injection device relative to each other, and preventing any leakage from the assembly 1 to the outside of said assembly.

The distal part 20 of the connector comprises a flange 21 which extends radially outwardly from the distal region 14 of the proximal part 10, and a skirt 22 which extends from the flange in the distal direction.

The skirt 22 is adapted to be connected to the collar 62 of the container. To that end, the skirt has a substantially cylindrical shape that matches the shape of the collar. Hence, when connected to the container, the skirt encloses the collar of the container. The skirt 22 may comprise at least one rim 25 that extends radially inwardly. Such rim 25 is configured to abut against a recess 64 of the collar 62 of the container 60 when the skirt 22 is connected to the container, thereby preventing the connector 2 from being pulled away in a proximal direction from the container 60. In particular, such rim prevents accidental removal of the connector during storage.

According to a preferred embodiment, the skirt 22 comprises a plurality of flexible tabs 24 separated from each other by recesses 23, said tabs being adapted to deflect radially outwardly for connecting the skirt to the container. The skirt thereby further fits to the dimensions of the collar, making the connection of the skirt to the container easier.

The tabs 24 are provided at their distal end with borders 25 that extend radially inwardly. When the skirt 22 is connected to the container 60, the tabs 24 abut against the recess 64 of the collar, thereby preventing the connector 2 from being pulled away in a proximal direction from the container 60. In particular, such borders prevent accidental removal of the connector during storage.

According to a preferred embodiment, the tabs 24 comprise hollow portions 26. The presence of the hollow portions facilitates the demolding of the connector during the manufacture, and further increase the ability of deflection of the tabs. In addition, the weight of the connector is reduced.

The hollow spike 30 has a cylindrical shape delimited by an outer surface 37, and extends distally in the inner space 27 of the skirt 22 along the axis A from the flange 21. The distal end of the hollow spike 30 is provided with a pointed end 35 configured to perforate the pierceable septum 63 of the container when the connector 2 is connected to the container 60. The internal volume 32 of the spike is in fluidic communication with the inner volume 12 of the proximal part of the connector.

According to a preferred embodiment, the hollow spike 30 is completely covered by the skirt 22. Hence, the skirt acts as a rigid cover that reduces the risk of a user pricking himself or any person around. Moreover, the skirt enables to auto-center the spike towards the pierceable septum 63 and thus eases the pricking of the pierceable septum 63 by the spike.

Preferably, the skirt protrudes 1 mm from the pointed end 35 of the hollow spike 30.

As illustrated in FIG. 1, the skirt 22 extends more distally than the spike 30.

According to a preferred embodiment, the spike 30 comprises a tapered pipe 33 that tapers away from said proximal part and a straight pipe 31 that extends further distally up to its pointed end 35.

The spike 30 comprises an opening 34 close to the pointed end 35. The opening 34 creates a fluidic connection between the medical injection device 40 and the container 60 when connected thereto.

The connector 2 is advantageously made in a single piece. In other terms, the proximal part 10, the distal part 20, and the hollow spike 30 are formed in a single piece of material, such as a plastic material. An example of appropriate material is polypropylene.

The assembly 1 further comprises a hollow sealing cap 50. A first embodiment of the sealing cap 50 is illustrated in FIGS. 2 to 6, and a second embodiment is illustrated in FIGS. 13 to 16.

The sealing cap comprises a closed distal part 52, a proximal part 53 provided with an opening 54, and a hollow body 51 that extends from the opening towards the distal part. The sealing cap is positioned on the spike 30 before connecting the connector 2 with the container 60, in particular during storage of the connector. When mounted on the spike, the sealing cap 50 sealingly covers the spike 30, and in particular covers at least the opening 34 of said spike. The sealing cap 50 thus prevents any injury to a person at the vicinity of the assembly. To the same purpose, the sealing cap is preferably made in a flexible material, such as elastomeric material, for example rubber or thermoplastic elastomer.

Moreover, the sealing cap 50 prevents any contamination of the spike from the external environment during storage.

The hollow body 51 of the sealing cap has a shape that matches that of the spike so as to allow the insertion of the spike 30 in the hollow body of the sealing cap. In FIGS. 2 and 3, the hollow body of the sealing cap has a cylindrical shape that tapers distally so as to match the pointed end of the spike.

According to the second embodiment illustrated in FIGS. 13 to 16, the proximal part 53 of the sealing cap is configured to be sealingly inserted into the flange 21 of the connector 2. In particular, the proximal end 55 of the sealing cap is inserted into a groove 16 provided in the flange 21 around the base 38 of the spike 30. This is clearly visible in FIG. 15. In that way, the proximal end 55 of the sealing cap is griped in the groove 16 and radially abuts the flange 21 of the connector. To provide a greater abutment surface, the flange 21 may comprise a rim 15 that extends distally therefrom, around the base 38 of the spike. This abutment maintains the proximal part 53 of the sealing cap onto the spike 30, as well as ensuring an optimal sealing of said spike. This abutment is particularly useful when the sealing cap is made in a flexible material, wherein the proximal end 55 of the sealing cap is prone to extend radially outwardly due to the nature of the material.

As such, optimal sealing of the hollow spike 30 is achieved by the contact between:

- the inner surface 56 of the sealing cap and the outer surface 37 of the spike, along the spike 30, from the base 38 to the pointed end 35 of the spike, and/or
- the outer surface 57 of the sealing cap and the inner surface of the groove 16 or the rim 15, at the base 38 of the spike.

Advantageously, the sealing cap further preferably comprises a ring 58 that protrudes radially from and around the sealing cap 50. The ring 58 is preferably integral with the sealing cap. The ring 58 and the sealing cap are preferably made in the same material. The ring 58 is configured to abut the rim 25 of the skirt 22 when the sealing cap 50 is mounted on the hollow spike 30. This abutment prevents the sealing cap 50 from being pulled off during sterilization, handling, and/or transportation of the connector.

Advantageously, the distal part 52 of the sealing cap 50 comprises a grip portion 80 configured to protrude distally away from the skirt when the sealing cap 50 is mounted on the hollow spike 30. The grip portion 80 is preferably integral with the sealing cap. The grip portion 80 and the sealing cap are preferably made in the same material. The grip portion 80 is configured to be handled by a user for mounting or removing the sealing cap 50 from the hollow spike 30.

The grip portion 80 preferably comprises a stem 81 that extends in the distal direction, parallel to the longitudinal axis A, from the rest of the sealing cap. The stem 81 extends distally from the ring and protrudes sufficiently from the skirt to be gripped by the user without the fingers of the user contacting the skirt 22, thereby preventing contamination of the skirt by the user.

The outer surface 82 of the stem may be advantageously be provided with grip marks that improve the grip of the fingers of the user onto said surface 82, thereby facilitating the positioning and the removal of the sealing cap. The grip portion 80 further comprises a flange 83 that is substantially perpendicular to the stem 81. The flange 83 acts as a handle the user may grip to manipulate the sealing cap easily. In particular, when handling the sealing cap 50, the thumb of the user may abut the distal surface 84 of the flange 83 and the index and middle finger of the user may abut the proximal surface 85 of the flange, which facilitates the removal of the sealing cap by helping him overcoming the resistance caused by the abutment of the ring 58 against the rim 25 of the skirt 22.

Figure 16:
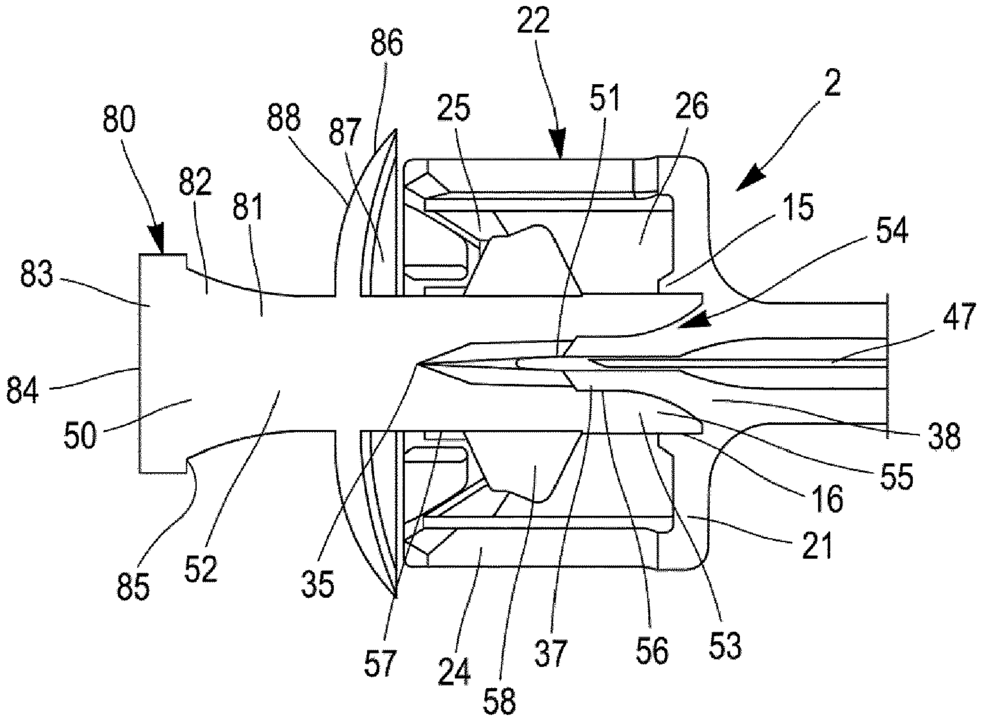
FIG. 16 is another side sectional view of the assembly of FIG. 13.

According to an embodiment illustrated in FIG. 16, the sealing cap 50 may be provided with an umbrella 86, preferably substantially circular, which extends radially outwardly from the stem 81 of the grip portion 80. The umbrella 86 comprises a proximal face 87 that faces the skirt 22, and a distal face 88 opposite the proximal face.

The umbrella 86 is preferably configured to abut the skirt 22 when the sealing cap is pushed in the proximal direction toward the skirt. To that end, the diameter of the umbrella 86 is advantageously substantially equal to or greater than the diameter of the skirt 22 so as to cover said skirt when the connector is observed from the distal face 88 of the umbrella 86.

When removing the sealing cap 50 from the spike 30, the umbrella prevents the fingers of the user from contacting the skirt 22, thereby preventing contamination of said skirt by the user when removing the sealing cap 50.

Figure 15:
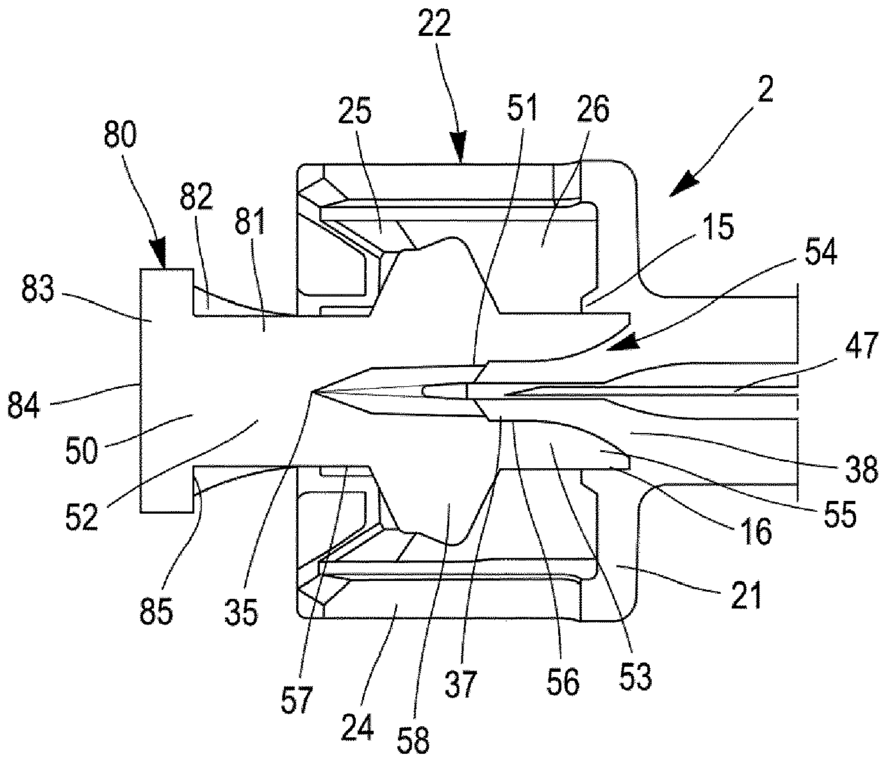
FIG. 15 is a side sectional view of the assembly of FIG. 13.

Although the injection device 40 illustrated in FIGS. 15 and 16 is provided with a needle 47, the sealing cap 50 may of course be mounted onto an injection device with no needle.

A method for transferring a composition from the container sealed by a pierceable septum to the medical injection device will now be described in the following, in reference to the FIGS. 4 to 12.

First, as illustrated in FIG. 4, the connector 2 is connected to the injection device 40, by screwing the proximal part of the connector to the tip 42 of the injection device. To this end, the body 11 of the proximal part is inserted in the housing 46 and rotated to ensure screwing of the respective threaded portions 13, 45 of the connector and the injection device. The tip 42 of the injection device is inserted in the inner volume of the proximal part and the needle 47, when present, is enclosed in the spike 30. The assembly 1 obtained is represented in FIG. 5.

According to the first embodiment, the spike 30 encloses a portion of the needle. The needle 47 extends along the axis A, from the tip 42 of the injection device, along the inner volume 32 of the spike, and further distally up to the distal end of the spike. The needle 47 may be staked in the tip 42.

According to the first embodiment, the injection outlet 49 of the needle preferably faces the opening 34 of the spike in an oblique or substantially radial direction.

Figure 6:
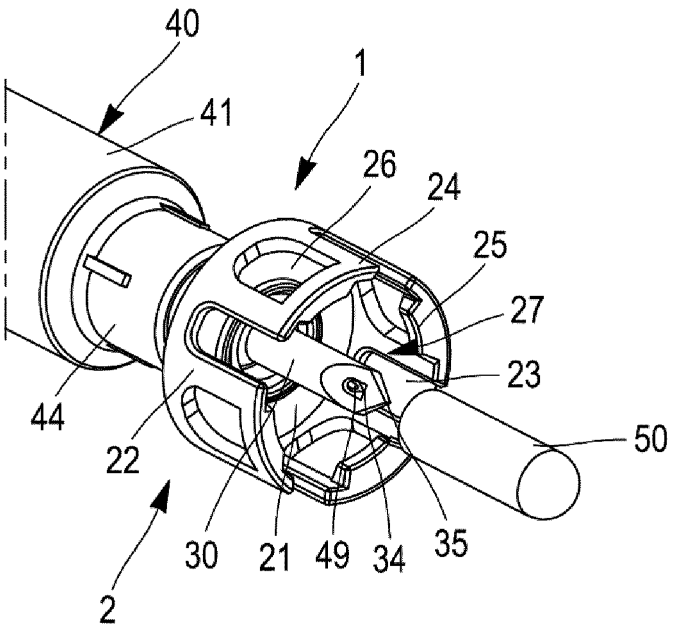
FIG. 6 is a perspective view of the assembly of FIG. 2, wherein a sealing cap according to a first embodiment is being removed from a hollow spike of the connector.

In the case where the spike 30 is previously covered by the sealing cap 50, said sealing cap is removed so as to expose the spike 30 and the opening 34, as illustrated in FIG. 6.

Figure 7:
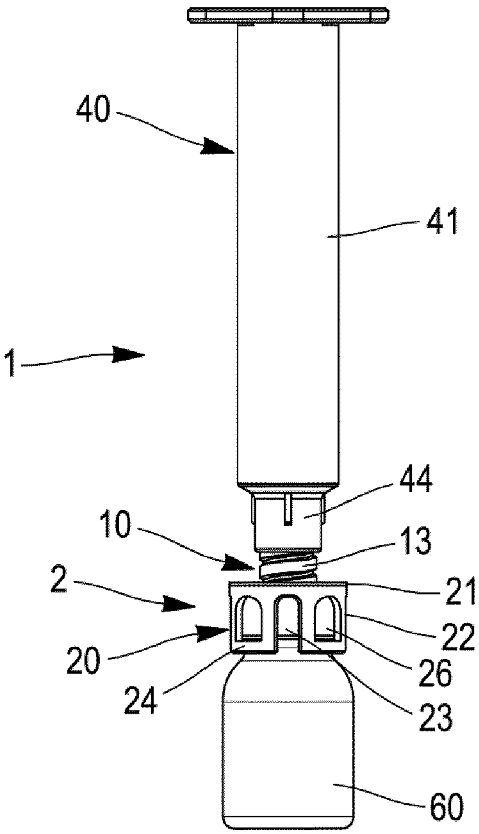
FIG. 7 is a side view of the assembly of FIG. 2, wherein the injection device is connected to a container via the connector, so as to transfer a first composition contained in the injection device.

In reference to FIG. 7, the connector 2 is then connected to the container 60. The distal part 20 of the connector engages the container 60, and the pointed end 35 of the spike perforates the septum 63 of the container.

In this configuration, the skirt 22 of the connector is firmly attached to the collar 62 of the container and encloses said collar.

A portion of the spike, including the opening 34, penetrates inside the container 60. The flange 21 of the distal part 20 abuts the collar 62 of the container, so that the spike 30 cannot go further distally inside the container. Hence, a portion 36 of the spike of a determined length, including a portion 48 of the needle enclosed therein when present, is located in the container. The length of this portion 36 of spike depends on the length of the spike itself and the structure of the distal portion 20, and may be adjusted when the connector is being designed.

The skirt 22 contacts the container, and the tabs 24 cover the collar 62. The tabs 24 may advantageously deflect radially outwardly to facilitate the connection. The borders 25 of the tabs abut against the recess 64 of the collar, thereby preventing the connector 2 from being separated from the container. The container 60 is thus maintained in a fixed position to the connector 2.

Since the spike 30 extends along the axis A in the inner space 27 of the skirt and said skirt encloses the collar of the container, the spike 30 is centered relative to the top surface 65 of the septum 63 of the container. This allows the insertion of the spike, and the needle enclosed herein when present, at the center of said top surface 65 of the septum, the spike 30 piercing the center portion 66 of the septum typically made of elastomer that is not covered by aluminum. Since the needle 47 is protected by the spike 30, it does not contact the septum or the wall of the container, and any deformation of the needle 47 is thus prevented.

When the skirt 22 extends more distally than the spike 30, the skirt 22 begins engaging the collar 62 of the container as the spike is proximally remote from the septum. Hence, thanks to the skirt, the spike is centered relative to the top surface 65 of the septum 63 and guided to the center portion 66 of the septum until full engagement of the connector onto the container.

Figure 8:
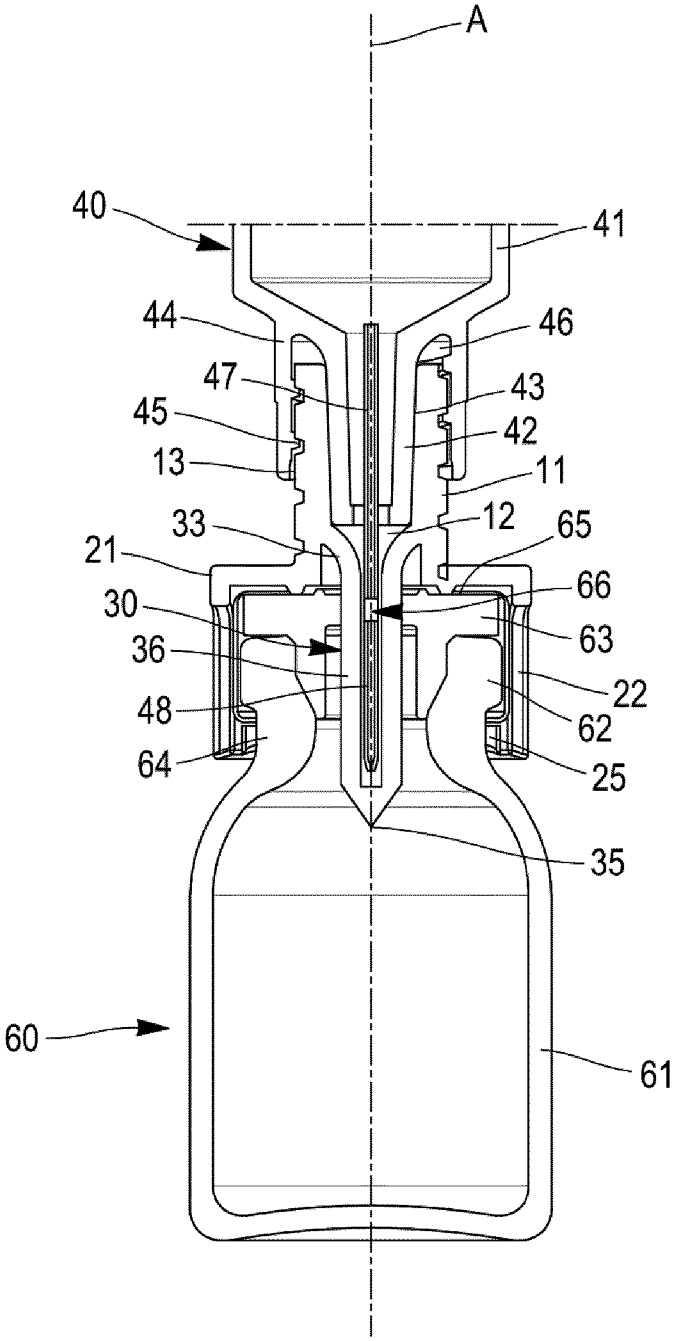
FIG. 8 is a side sectional view of the injection device, the connector, and the container of FIG. 7.

As visible in FIG. 8, the connector 2 is configured so that when the spike 30 is inserted in the septum 63 of the container, the opening 34 of the spike is located slightly distally relative to the septum, in the vicinity of the septum.

A first composition, contained in the injection device, is then transferred into the container prefilled with a second composition. To that end, the user pushes the plunger rod (not represented) of the injection device in the distal direction.

According to the first embodiment, the composition flows along the needle 47, passes through the outlet 49 of the needle, and is expelled from the spike 30 via the opening 34 and transferred into the container 60. In the case where the outlet 49 of the needle faces the opening 34 of the spike, the first composition passes directly from the outlet of the needle to the opening of the spike, which limits the contact of said first composition with the inner volume of the spike and limits pressure losses.

According to the second embodiment, the composition flows along the spike 30 in contact with the inner wall of the spike, and is expelled from the spike via the opening 34 and transferred into the container 60.

The first composition is then mixed with the second composition. To that end, the user may handle both the assembly 1 and the container 60, and shake them gently so as to allow the mixing.

The mixed compositions are then drawn back to the injection device.

To that end, the assembly 1 and the container 60 are turned upside down, and the user pulls the plunger rod of the injection device, thereby creating a suction effect through the spike. In this position, the opening 34 of the spike remains immersed in the mixed compositions regardless the amount of compositions remaining in the container. Therefore, complete withdrawal can be achieved with no need to adjust the length of the portion 36 of the spike inserted in the container. In other terms, the user does not need to move the needle relative to the container as in the prior art for keeping the needle immersed in the mixed compositions as long as the withdrawal goes. This saves the user from having to perform complicated and imprecise manipulations in order to adjust the length of the portion of needle inserted in the container, and makes the transfer between the injection device and the container much faster and easier.

According to the first embodiment, the suction effect is also created in the needle 47. The mixed compositions flow from the container 60 into the needle 47 via the opening 34 of the spike and the outlet 49 of the needle, and is then transferred into the barrel 61 of the injection device.

In the case where the outlet 49 of the needle faces the opening 34 of the spike, the mixed compositions pass directly from the opening 34 of the spike to the outlet 49 of the needle, which limits the contact of said composition with the inner wall of the spike and limits pressure losses.

According to the second embodiment, the mixed compositions flow from the container 60 into the inner volume 32 of the spike via the opening 34 of the spike, and is then transferred into the barrel 61 of the injection device.

During withdrawal, the connection between the proximal part of the connector and the tip and sleeve of the injection device ensures the sealing of the assembly and prevents any leak from the assembly to the outside of said assembly.

Figure 9:
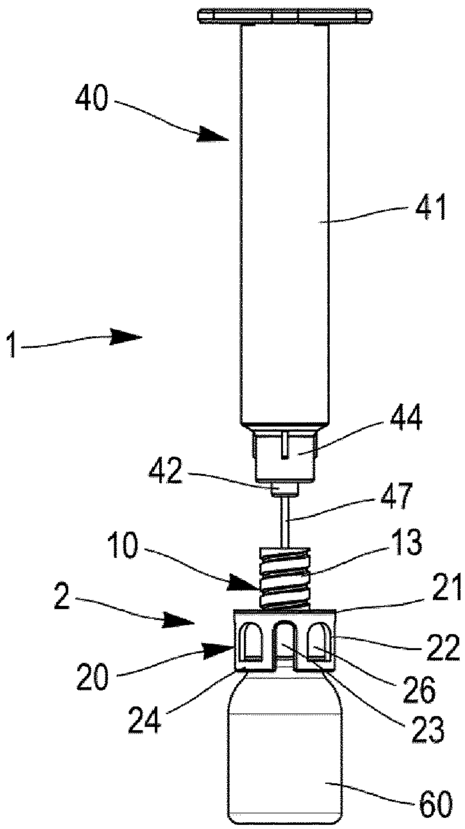
FIG. 9 is a side view of the injection device and connector, wherein the injection device is being removed from the connector after withdrawal of the composition, the connector remaining connected to the container.
Figure 10:
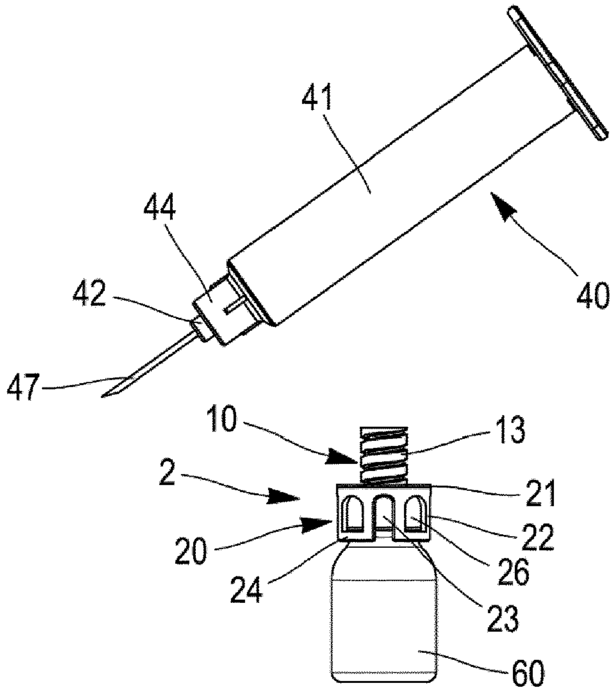
FIG. 10 is a side view of the injection device and connector, wherein the injection device is completely removed from the connector, according to the first embodiment of the invention.

In reference to FIGS. 9 and 10, the injection device 40 is then separated from the connector 2. To this end, the body 11 of the proximal part is rotated to cause unscrewing of the respective threaded portions 13, 45 of the connector and the injection device. The tip 42 of the injection device disengages the inner volume of the proximal part, and the needle 47, when present, is removed from the spike 30. The connector 2 remains connected to the container 60 and may be further disposed of.

According to the first embodiment, the injection device containing the mixed compositions is then ready to be used.

Figure 11:
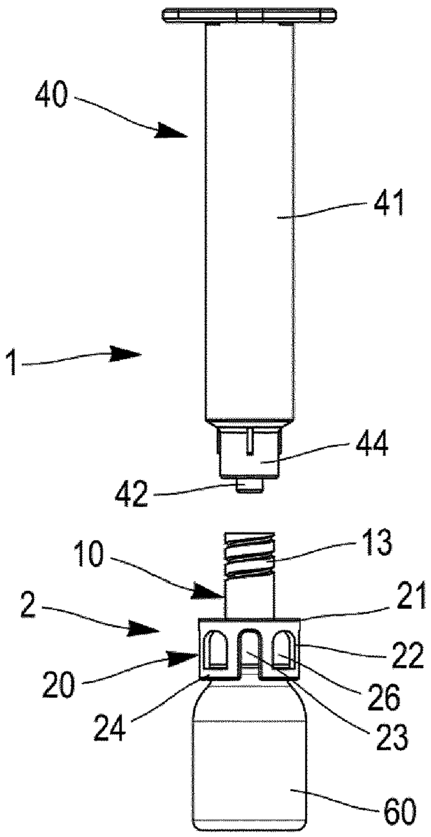
FIG. 11 is a side view of the injection device and connector, wherein the injection device is completely removed from the connector, according to the second embodiment of the invention.
Figure 12:
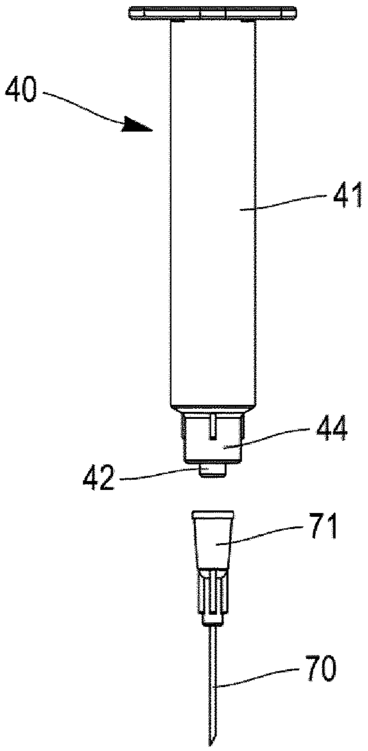
FIG. 12 is a side view of the injection device according to the second embodiment of the invention with a disposable needle adapted to be mounted thereon.
Figure 13:
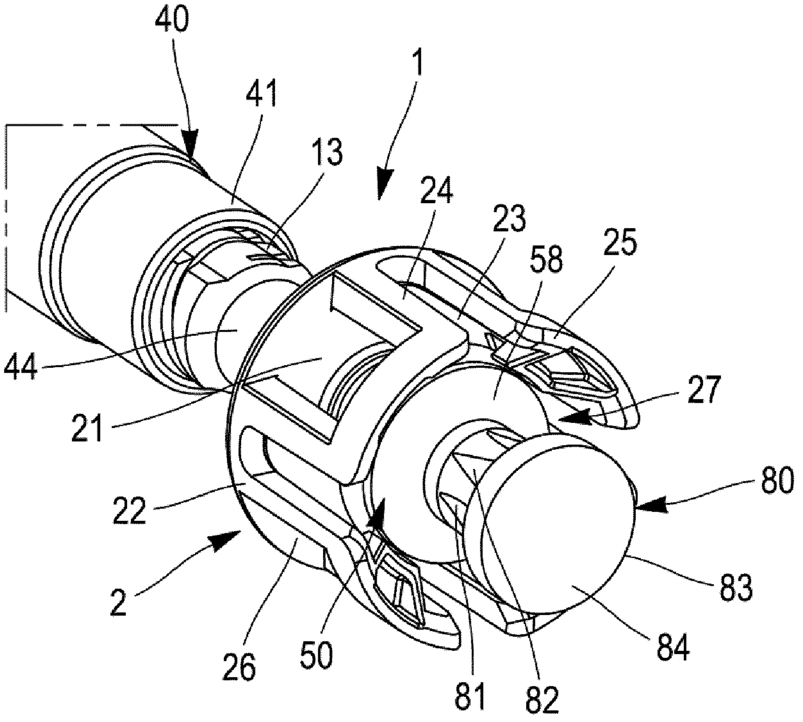
FIG. 13 is a perspective view of the assembly of the invention, wherein a sealing cap according to a second embodiment is mounted onto the hollow spike of the connector.
Figure 14:
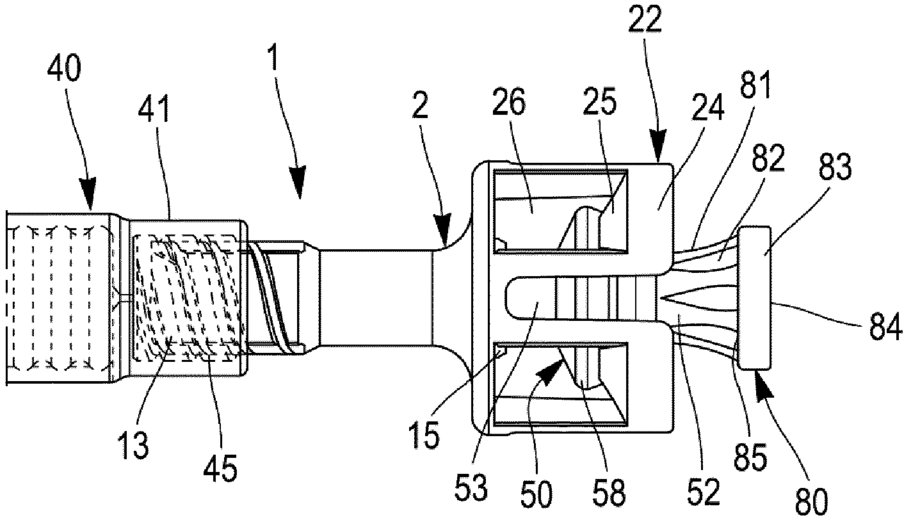
FIG. 14 is a side view of the assembly of FIG. 13.

According to the second embodiment, a needle 70 is removably mounted on the tip 42 of the injection device after separating the injection device from the container, as illustrated in FIGS. 11 and 12.

The needle 70 is fixed to the injection device via its fitting 71 which is inserted in the housing 46 between the tip 42 and the sleeve 44 of the injection device, preferably by screwing onto the sleeve.

According to a preferred embodiment, the method described above is related to the reconstitution of a drug, wherein the first composition is a diluent and the second composition is a drug content, such as for example a lyophilized drug or an active substance of a drug.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A connector for connecting a medical injection device having a distal tip and a sleeve extending around the distal tip, the sleeve being provided with an inner threaded portion, to a container closed by a pierceable septum, the connector comprising: a proximal part configured to sealingly engage the distal tip of the injection device, the proximal part comprising an outer threaded portion configured to be removably screwed to the inner threaded portion of the sleeve; a distal part configured to be connected to the container; a hollow spike extending distally from the proximal part, having an internal volume configured to be in fluidic connection with the injection device, the hollow spike being configured to perforate the pierceable septum of the container when the distal part is connected to the container, the hollow spike comprising an opening in a distal end, the opening being configured to create a fluidic connection between the medical injection device and the container, wherein the distal part comprises a skirt extending around the hollow spike; and a sealing cap mounted on the hollow spike so as to sealingly enclose at least the opening of the hollow spike, wherein the sealing cap comprises a ring protruding radially outwardly from a hollow body, the ring being configured to abut the skirt when the sealing cap is mounted on the hollow spike so as to retain the sealing cap on the hollow spike.

2. The connector of claim 1, wherein the skirt is adapted to enclose at least a collar of the container when connected to the container.

3. The connector of claim 2, wherein the skirt comprises at least one rim that extends radially inwardly, the at least one rim being configured to engage a recess of the collar of the container when the skirt is connected to the container.

4. The connector of claim 3, wherein the ring is configured to abut the at least one rim of the skirt.

5. The connector of claim 1, wherein the skirt is adapted to deflect radially outwardly when connected to the container.

6. The connector of claim 1, wherein the skirt is provided with a plurality of flexible tabs separated from each other by recesses, the flexible tabs being configured to deflect radially outwardly when the skirt is connected to the container.

7. The connector of claim 1, wherein the skirt extends more distally than the hollow spike.

8. The connector of claim 1, wherein the internal volume of the hollow spike is configured to accommodate a needle of the injection device fixed to the distal tip of the injection device.

9. The connector of claim 1, wherein the skirt comprises a flange, the sealing cap comprises a closed distal part, a proximal part provided with an opening, and the hollow body extends from the opening towards the distal part, the hollow body being configured to sealingly engage the hollow spike, and the proximal part of the sealing cap being configured to be sealingly and at least partially inserted into a groove provided in the flange so that the proximal part of the sealing cap radially abuts an inner surface of the groove.

10. The connector of claim 1, wherein the ring is integral with the sealing cap.

11. The connector of claim 1, wherein a distal part of the sealing cap comprises a grip portion configured to protrude distally away from the skirt when the sealing cap is mounted on the hollow spike, and configured to be handled by a user for mounting or removing the sealing cap from the hollow spike.

12. The connector of claim 11, wherein the grip portion comprises a stem that protrudes from the skirt, and a flange substantially perpendicular to the stem that acts as a handle configured to be gripped between a user's fingers to manipulate the sealing cap.

13. An assembly comprising: the connector of claim 1; and the medical injection device comprising a barrel, the distal tip extending distally from the barrel, and the sleeve extending around the distal tip, the sleeve being provided with the inner threaded portion, wherein the proximal part of the connector is in threaded engagement with the inner threaded portion of the sleeve and sealingly engages the tip of the medical injection device.

14. The assembly of claim 13, wherein the medical injection device comprises a needle staked in the distal tip, the needle extending into the hollow spike of the connector.

15. The assembly of claim 14, wherein the needle extends into the hollow spike up to the opening of the hollow spike.

16. The assembly of claim 15, wherein an injection outlet of the needle and the opening of the hollow spike face each other in a radial direction.

17. The assembly of claim 13, wherein the barrel, the distal tip, and the sleeve are integrally formed as a single piece.

18. The assembly of claim 13, wherein the medical injection device is a prefilled syringe.

19. A method for transferring a composition, the method comprising the steps of: providing the connector of claim 1; providing the medical injection device with the distal tip and the sleeve extending around the distal tip, the sleeve being provided with the inner threaded portion, and the connector screwed to the distal tip via the inner threaded portion of the sleeve; connecting the connector to the container by engaging the distal part of the connector with the container, the hollow spike thereby perforating the septum of the container; transferring into the container a first composition contained in the injection device through the internal volume of the hollow spike; mixing the first composition with a second composition contained in the container; drawing the mixed compositions from the container back to the injection device; and unscrewing the injection device from the connector.

20. The method of claim 19, wherein prior to connecting the connector to the container, the sealing cap is removed from the hollow spike so as to expose the hollow spike and the opening.

* * * * *